United States Patent [19]

Wolz et al.

[11] 3,890,992

[45] June 24, 1975

[54] METHOD AND APPARATUS FOR SAFEGUARDING PIPE-LINES AGAINST AN INADMISSIBLY HIGH INTERNAL COMPRESSIVE LOAD BY A CONTROL VALVE WITH A PNEUMATIC DRIVE

[75] Inventors: Werner Wolz; Hans Bender, both of Mannheim; Manfred Schmitt, Bobenheim-Roxheim, all of Germany

[73] Assignee: Fa. Gulde-Regelarmaturen KG, 67 Ludwigshafen-Oggersheim, Germany

[22] Filed: Sept. 27, 1973

[21] Appl. No.: 401,500

[52] U.S. Cl. .............. 137/14; 137/488; 137/487.5
[51] Int. Cl. .............................................. G05d 7/06
[58] Field of Search ............ 137/12, 14, 487.5, 10, 137/2, 486; 235/151.31, 485, 487.5, 488, 12

[56] References Cited
UNITED STATES PATENTS

| | | | |
|---|---|---|---|
| 2,857,928 | 10/1958 | Lerner et al. | 137/488 X |
| 2,950,682 | 8/1960 | Kimmel | 137/12 |
| 3,225,785 | 12/1965 | Goike | 137/487.5 X |
| 3,369,561 | 2/1968 | Zimmerman et al. | 137/487.5 X |
| 3,527,241 | 9/1970 | Bristow et al. | 137/487.5 X |
| 3,552,428 | 1/1971 | Pemberton | 137/487.5 X |
| 3,686,970 | 8/1972 | Bozoyan | 137/625.63 X |
| 3,699,989 | 10/1972 | O'Connor | 137/487.5 |
| 3,711,457 | 1/1973 | Ayres | 137/12 X |

Primary Examiner—Martin P. Schwadron
Assistant Examiner—Robert J. Miller
Attorney, Agent, or Firm—Irwin M. Aisenberg

[57] ABSTRACT

A method of safeguarding a pipe-line against excessive fluid pressure by means of a pneumatically operated relief valve, wherein the fluid pressure in the pipe-line is monitored and air supplied at a pressure which is a function of the monitored pressure to hold the valve closed. But if the rate of increase in fluid pressure causes the rate of increase in air pressure to exceed a predetermined value, further valves are actuated so that the air pressure holding the valve closed is reduced allowing opening of the relief valve.

6 Claims, 2 Drawing Figures

METHOD AND APPARATUS FOR SAFEGUARDING PIPE-LINES AGAINST AN INADVISSIBLY HIGH INTERNAL COMPRESSIVE LOAD BY A CONTROL VALVE WITH A PNEUMATIC DRIVE

The invention relates to a method and apparatus for safeguarding pipe-lines against an inadmissibly high internal compressive load by a control valve with a pneumatic drive.

If a stream of liquid is delayed in a pipe, for example in a long-distance petroleum line, for example by closing a shut-off device or by stopping a pump, then inadmissibly high pressures may occur.

A known method of limiting the pressure rise may be performed by providing a safety valve which opens when a predetermined pressure, the so-called response pressure, is exceeded and thus limits the pressure rise by diverting a part or all of the stream of liquid.

Safety valves are known in which the closing member is pressed against the valve seating by an adjustable spring force. These safety valves open when the force of the internal pressure of the pipe at the surface of the closing member exceeds the spring force.

Safety valves also exist in which the spring is replaced by a gas pressure which acts on a diaphragm or a piston.

Safety valves are also known which are opened by means of a so-called pilot valve, as soon as the response pressure of the pilot valve is reached.

These known systems have the following drawbacks:

a. the response pressure must be set at the highest internal pressure of the pipe plus a safety margin. Therefore, the safety valve only begins to open when the pressure wave passes into the region of the admissible value.

b. In the case of high pressures in the pipe, the safety member loaded by gas pressure requires a supply of gas which is capable of producing at least equal pressures.

Thus, the following requirements are made of a safety system which avoids these drawbacks:

1. The valve must open as soon as a predetermined, adjustable threshold for the gradient pressure rise is exceeded in the pipe.

2. Pressure changes in the pipe, whose coefficient with respect to time does not reach this threshold, should have the effect that by adapting the drive pressure, an equilibrium of forces is retained in the valve. This should have the effect that the valve is directly opened by very rapid pressure changes, if the latter are not detected sufficiently quickly by the apparatus for fulfilling requirement 1.

3. If the apparatus is operated pneumatically, a supply from a normal low pressure system should be possible.

4. The valve should additionally respond to an adjustable upper pressure threshold.

All the said requirements are fulfilled according to the invention. For the purpose of improving the control characteristic, the actual internal pressure of the pipe is transformed by an adjustable pressure ratio regulator with a multiplication and addition member to lower pressure for the control member, is subsequently differentiated and is compared with a reference value. When it exceeds the reference value, it is used for venting; when it falls short of this value, it is used for adjusting the drive pressure.

The immediate opening of the valve is advantageously achieved in that the driving force is kept in equilibrium with the force bringing about opening by means of a pressure ratio regulator. By means of the addition member, a certain pressure is formed in the direction closing the control valve so that the system does not operate exactly at an unstable working point.

An additional advantage of the pressure ratio regulation is that it allows a low drive pressure, which facilitates the supply of auxiliary energy. The equilibrium between the force of the closing member effecting about the opening action and the force of the drive resulting in the closing action, enables the valve to open with a very rapid pressure increase even when the differentiation and comparison circuit does not react sufficiently quickly and fails.

A greater safeguard against failure of the differentiating and comparison circuit and of the pressure ratio regulator is provided by setting the drive pressure at a limiting value with a pressure regulator. The valve thus automatically opens when an admissible internal pipe pressure is exceeded.

If the auxiliary energy fails, the safety function is retained since a pressure monitor stops the air consumption and connects the pressure regulator directly to the drive.

The operations of the differentiating and comparison circuit and of the pressure ratio regulator and pressure monitor may be carried out both pneumatically and electrically.

The invention is described in detail hereafter with reference to the drawing.

Figure 1:
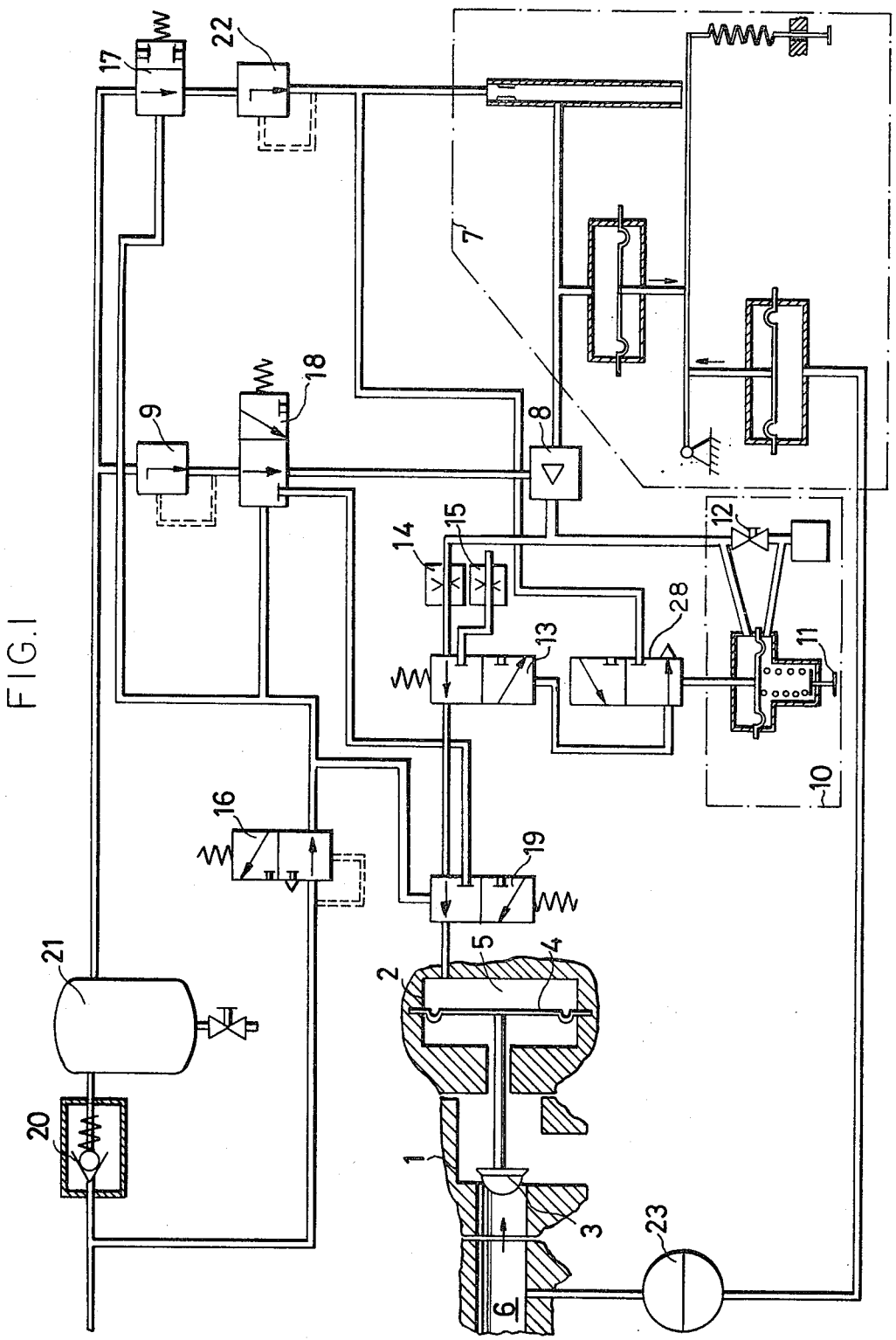
FIG. 1 is the circuit diagram of an apparatus with a pneumatic arrangement for carrying out the method according to the invention.

A valve 1 with a pneumatic drive 2 serves for protecting the pipe. The surface of a closing member 3 from which the pressure has not been relieved reacts with respect to a drive surface 4 like the maximum pressure available in a drive chamber 5 with respect to the maximum operating pressure at an inlet 6 of the valve. The pressure in the inlet of the pipe 6 is transformed to the desired air pressure by means of a pressure ratio regulator 7. The function of the pressure ratio regulator 7 consists of a multiplication and addition, both being adjustable on the balance beam of the force comparator. A power amplifier 8 ensures that sufficient air is available for the pneumatic drive. The pressure ratio between the input and output of the power amplifier is normally 1:1, however, the output pressure is limited to the value set at a pressure regulator 9 (this pressure regulator serves for adjusting the required pressure threshold). A pressure wave occurring in the pipe 6 is evaluated by means of a differentiating and comparison device 10; on exceeding the threshold for the rate of pressure rise (this threshold may be set at a setting member 11 of the diaphragm springs and/or at a throttle valve 12) air is removed from the drive chamber 5 by three-way valve 13 and the valve 1 is opened. After the decay of the pressure wave, air is supplied to the drive chamber 5 through three-way valve 13, due to which the valve 1 closes. The speeds at which air is supplied and removed may be adjusted by throttles 14, 15.

If the air system fails, the further consumption of air is prevented by means of a pneumatic pressure monitor 16 and a valve 17. Furthermore, the output of the pressure regulator 9 is directly connected to the drive chamber by means of three-way valves 18 and 19.

In addition to the aforementioned constructional parts, the following parts also belong to this safety system, namely a non-return valve 20, an air tank 21, a pressure regulator 22 and possibly a coupling device 23 for transmitting pressure from one fluid to another. The device 23 is necessary if the medium conveyed in the pipe 6 is not the same hydraulic pressure medium used in the pressure ratio regulator 7.

The operation of the apparatus illustrated in FIG. 1 will now be summarized.

Assuming a rapid pressure increase in the pipe 6, a characterizing control signal is applied to the power amplifier 8 and a corresponding pressure signal will appear at the output of the amplifier 8. This pressure signal also depends on the setting at the valve 9. The output signal from the power amplifier 8 is directly applied to the drive chamber 5 of the regulator valve 1. Thus, the pressure in the drive chamber 5 is a function of the pressure in the pipe 6 and normally is such that the closing member 3 of the valve 1 will be forced against its seat. As it may also be observed from FIG. 1, the output signal from the power amplifier 8 is also applied directly to the upper chamber of the diaphragm box of the device 10 and, through the delaying throttle 12, to the lower chamber of the diaphragm box. Thus, the pressure is differentiated and the differential value is automatically compared with the pressure comparison value set at 11. If the differentiated value (dp/dt) is larger than the reference value set at 11, the diaphragm will move downwardly and thus the diaphragm rod connected to the valve 28 will cause the latter to assume its other position. In the new position of the valve 28, actuating pressure from the pneumatic source 21 through a pressure adjusting valve 22 will pass through the valve 28 and thus an actuating pressure is applied to the valve 13. As a response, the valve 13 will be switched, whereby the pressure in the driving chamber 5 is relieved through the valve 13 and the throttle 15. Thus, the driving chamber 5 becomes depressurized, whereupon the pressure in the pipe-line 6 unseats the closing member 3 and thus pressure from the pipe-line 6 is relieved. It is noted that the abovedescribed operation took place because the rate of change of the pressure within the pipe 6 exceeded a preset value. It follows that if such a rate of change is below the value set at 11, the differentiated value will be below the reference value set at 11 and thus a pressure increase will occur in the drive chamber 5. This is so because the valves 28 and 13 remain in their illustrated position, but the pressure increase at the output of the power amplifier 8 will be applied to the drive chamber 5. Thus, there occurred a pressure increase of permissible rate and the pressure increase in the pipe 6 was now balanced by a comparable increase in the drive chamber 5.

Let it now be assumed that there occurs, in the pipe-line 6, a slow pressure increase with a final peak value which exceeds a safe magnitude (that is, a threshold value set at the valve 9). As the pressure in the pipe-line 6 slowly increases, the device 10 will not respond because the rate of change of the pressure is small (that is, the differential value $dp/dt$ is smaller than the reference value set at 11). As a result, the diaphragm of the device 10 remains stationary and consequently, the drive chamber 5 of the valve 1 continues to be connected with the power output of the amplifier 8. Due to the large pressure value, however, a large control signal is applied to the control input of the power amplifier 8 and consequently the maximum power output, as set by the valve 9, is applied to the drive chamber 5. The pressure value set at 9, however, is a limit value and if the magnitude of this pressure communicated to the drive chamber 5 by the output of the amplifier 8 is smaller than the above-noted pressure peak in the pipeline 6, the closing member 3 will be unseated and a pressure relief will take place. Thus, the valve 1 was actuated, in this case, not by an excessive rate of change of the pressure but by an excessive absolute pressure value.

Figure 2:
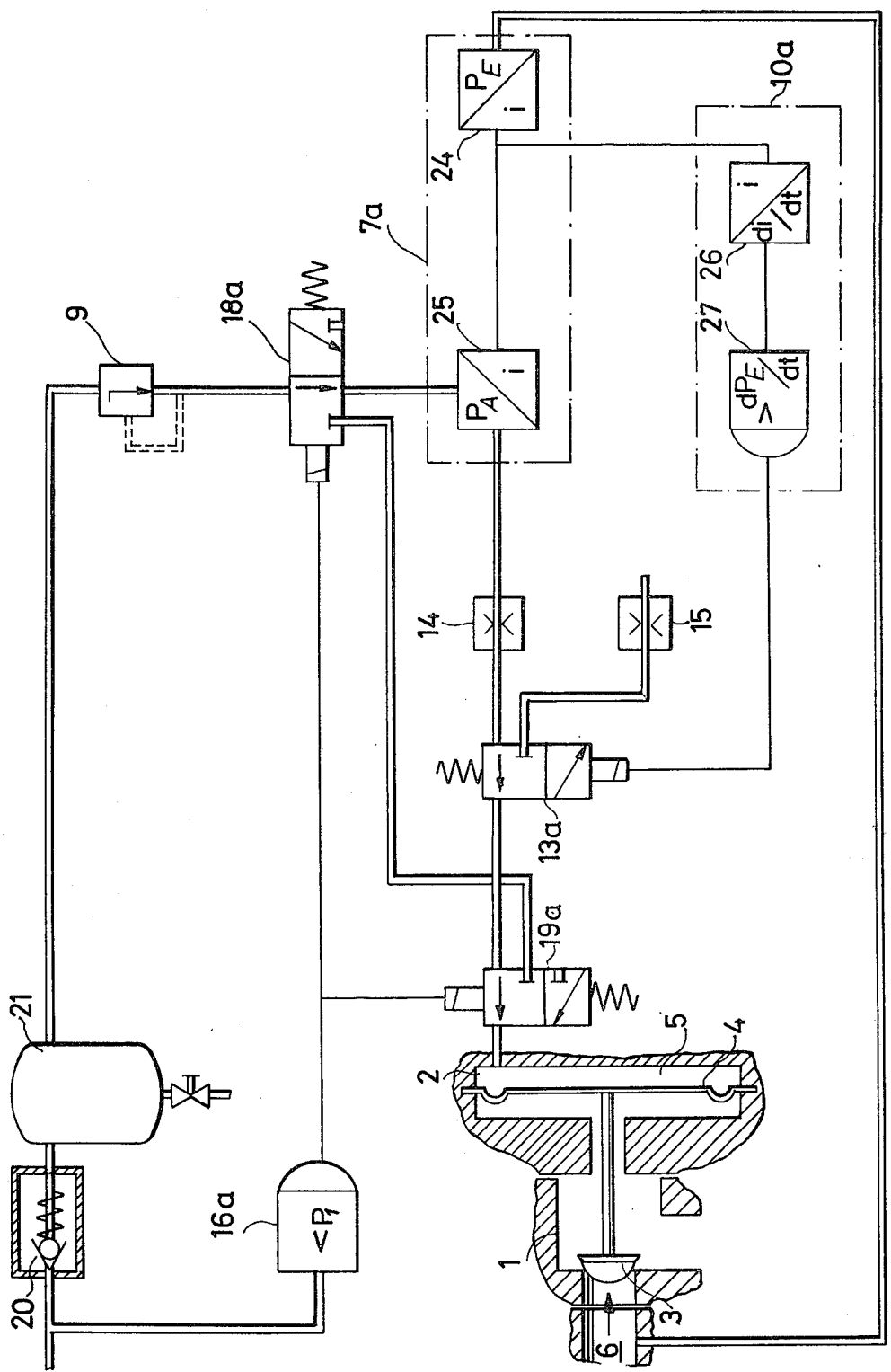
FIG. 2 is the circuit diagram with an electro-pneumatic arrangement according to the invention.

The embodiment according to FIG. 2 differs from that of FIG. 1 in that three-way valves 13a, 18a and 19a are constructed as electro-magnetic valves. In this case, the pressure monitor 16a is an electro-pneumatic member.

A pressure ratio regulator 7a comprises an input member 24 in which a pressure $P_E$ is converted into an electrical signal, for example a current $i$. In the output member, the electrical signal is reconverted into a pneumatic signal $P_A$, a power amplification simultaneously taking place corresponding to the flow of air necessary for supplying air to the drive 2.

The signal $i$ is also supplied to a differentiating and comparison apparatus 10a. The latter consists for example of a differentiating member 26 and a Schmitt trigger 27. If the pressure rise speed $dP_E/dt$ exceeds the limiting value set at 26 and/or 27, then a magnet of a three-way valve 13a is excited and the valve is switched according to the embodiment of FIG. 1.

If the air system fails, i.e. if the pressure in the air pipe falls below the limiting value and/or if the electrical energy fails, then the supply of electrical energy to the threeway magnetic valves 18a and 19a is interrupted by the pressure monitor 16a; both valves are reversed so that the drive chamber 5 is directly connected to the output of the pressure regulator 9.

The method and apparatus according to the invention thus advantageously ensure immediate response of the control member at the time of a rapid pressure increase. Owing to the superior shut-off control for the drive pressure, the pressure in the pipe is additionally monitored as such and a slow variation in excess of a maximum value is avoided. This maximum value may for example be additionally adjusted depending on the height of the monitoring station.

What is claimed is:

1. A method for safeguarding a pipe-line against an inadmissibly high internal pressure and an inadmissibly large rate of pressure increase, comprising the following steps:
   a. generating a first, pressure, signal as a function of the momentary pressure in said pipe-line;
   b. continuously applying said first pressure signal to a pressure ratio regulator for generating, at an output of the pressure ratio regulator, a second signal as a function of said first signal;
   c. applying a presettable constant pneumatic pressure to the power input of a power amplifier;
   d. applying said second signal to the control input of said power amplifier for generating a third, pneumatic pressure, signal at the output of said power amplifier, said third pressure signal being a function of said second signal;

e. applying said third signal to a drive chamber of a regulator valve connected to said pipe-line; the pressure in said drive chamber opposing the valve opening pressure constituted by the internal pressure in said pipe-line, whereby an increase of the internal pressure in the pipe-line causes an increase of pressure in said drive chamber until the pressure in said drive chamber reaches a threshold value set for said presettable constant pneumatic pressure, and whereby said internal pressure, upon exceeding said threshold value, causes opening of said regulator valve;

f. differentiating said third signal with respect to time to obtain a pressure differential characterizing the rate of pressure change in the pipe-line;

g. comparing said pressure differential with a reference value; and h. depressurizing said drive chamber if said pressure differential exceeds said reference value, whereby said regulator valve is opened by said internal pressure.

2. An apparatus for safeguarding a pipe-line against an inadmissibly high internal compressive load, comprising in combination:

a. a regulator valve disposed in said pipe-line and arranged to be openable by the internal pressure in said pipe-line; said regulator valve including means defining a chamber means for receiving pneumatic pressure to oppose the valve-opening force of said internal pressure;

b. a pressure ratio regulator having an input and an output;

c. means connecting, at least indirectly, the inside of said pipe-line with said input of said pressure ratio regulator, for applying, to said input, a first signal as a function of the momentary pressure in said pipe-line to generate, at said output of said pressure ratio regulator, a second signal as a function of said first signal;

d. differentiating and comparison means for differentiating pressure with respect to time and for comparing a reference value with the pressure differential, said differentiating and comparison means having an input and an output;

e. means connecting said output of said pressure ratio regulator at least indirectly to said input of said differentiating and comparison means; and f. depressurizing means connected to said output of said differentiating and comparison means and to said chamber means of said regulator valve for depressurizing said chamber means if said differential exceeds said reference value, whereby the internal pressure in said pipe-line causes opening of said regulator valve.

3. An apparatus as defined in claim 2, further including g. pneumatic pressure generating means;

h. a power amplifier having a power input connected to said pneumatic pressure generating source, a control input connected to said output of said pressure ratio regulator and an output connected to said differentiating and comparison means and to said drive chamber; and i. pressure setting means connected between said pneumatic pressure generating means and said power input of said power amplifier to set the maximum output pressure magnitude of said power amplifier.

4. An apparatus as defined in claim 3, further comprising means responsive to a failure of said pneumatic pressure generating means for directly connecting, upon such failure, said chamber means of said regulator valve with said pressure setting means and for interrupting, upon such failure, communication between said output of said power amplifier and said chamber means of said regulator valve.

5. An apparatus as defined in claim 2, wherein said pressure ratio regulator and said differentiating and comparison means are constituted of pneumatic components.

6. An apparatus as defined in claim 2, wherein said pressure ratio regulator and said differentiating and comparison means are constituted of electric components.

* * * * *